United States Patent [19]

Nordness et al.

[11] Patent Number: 5,089,308
[45] Date of Patent: Feb. 18, 1992

[54] COEXTRUDED FILM AND METHODS COMPRISING VINYLIDENE CHLORIDE METHYL ACRYLATE COPOLYMER

[75] Inventors: Mark E. Nordness; Frank T. Bauer; Robert J. Blemberg, all of Appleton; John P. Eckstein; David M. Banik, both of Neenah; Grant A. Gustafson, Menasha, all of Wis.

[73] Assignee: American National Can Company, Chicago, Ill.

[21] Appl. No.: 458,485

[22] Filed: Dec. 28, 1989

Related U.S. Application Data

[63] Continuation-in-part of Ser. No. 140,096, Dec. 31, 1987, Pat. No. 4,944,972, and a continuation-in-part of Ser. No. 204,485, Jun. 9, 1988, abandoned.

[51] Int. Cl.$^5$ .................... B32B 27/08; B29C 47/00
[52] U.S. Cl. .................... 428/35.4; 428/36.6; 428/412; 428/480; 428/476.3; 428/518; 264/171
[58] Field of Search ............... 428/518, 480, 483, 412, 428/522, 35.4, 36.6, 476.3; 264/171

[56] References Cited

U.S. PATENT DOCUMENTS

| | | | |
|---|---|---|---|
| 3,477,099 | 11/1969 | Lee et al. | 18/13 |
| 3,558,330 | 1/1971 | Widiger et al. | 99/174 |
| 4,379,117 | 4/1983 | Baird, Jr. et al. | 428/518 |
| 4,714,638 | 12/1987 | Lustig et al. | 428/518 |
| 4,755,402 | 7/1988 | Oberle | 428/518 |
| 4,804,510 | 2/1989 | Luecke et al. | 264/169 |
| 4,842,791 | 6/1989 | Gould et al. | 264/171 |
| 4,868,064 | 9/1989 | Grosjean | 428/480 |

*Primary Examiner*—James J. Seidleck
*Attorney, Agent, or Firm*—Robert A. Stanzel

[57] ABSTRACT

Vinylidene chloride methyl acrylate copolymer coextruded with second and third different polymeric compositions in fabrication of multiple layer films. The third layer is between the first and second layers. The second composition can have a melting temperature greater than 204° C., and can be, for example, polyester, polyamide, or polycarbonate. Preferred films contain at least five layers, at least one of which has a typical extrusion processing temperature higher than the typical extrusion processing temperature of the VDC-MA. Methods of fabricating such films are also disclosed.

21 Claims, 6 Drawing Sheets

COEXTRUDED FILM AND METHODS COMPRISING VINYLIDENE CHLORIDE METHYL ACRYLATE COPOLYMER

This application is a continuation-in-part application of the following applications:

Ser. No. 07/140,096 filed Dec. 31, 1987 now U.S. Pat. No. 4,944,972;

Ser. No. 07/204,485 filed June 9, 1988, now abandoned.

The above applications are incorporated herein by reference in their entireties.

BACKGROUND OF THE INVENTION

This invention relates to coextruded films comprising vinylidene chloride methyl acrylate copolymer (VDC-MA), and particularly films which contain a layer of another polymeric material which has a melting temperature higher than the melting temperature of the VDC-MA.

As used herein, "film" means and includes films, which generically encompass thicknesses up to about 20 mils, sheets, which generically encompass thicknesses greater than about 20 mils, and extruded tubes of all thicknesses.

The invention especially related to the extrusion of a VDC-MA which is sensitive to a first set of thermal conditions at which it is processed, with a second polymeric composition which is typically processsed at a second set of more intense thermal conditions (higher temperature). Where the second set of thermal conditions is sufficiently intense, the VDC-MA can be adversely changed and degraded as a result of those conditions, by use of conventional extrusion methods.

In the present view of the inventors, VDC-MA is preferable to vinylidene chloride vinyl chloride (VDC-VC) copolymer in that films containing a VDC-MA layer provide better barrier properties than corresponding films containing a VDC-VC layer. Therefore, VDC-MA does have some properties that make it preferable over VDC-VC. However, extrusion of VDC-MA is more difficult than extrusion of VDC-VC, even under ordinary conditions, because it is more susceptible, than VDC-VC, to that degradation in the extrusion processing equipment which produces specks of black carbonized material in the extruded film. Accordingly, under conditions where it is difficult to extrude VDC-VC, one would expect even greater difficulty in extruding VDC-MA. So, the probability of success with VDC-MA under those conditions would be lessened, whereby a simple substitution of VDC-MA for VDC-VC would be expected to encounter greater difficulty. With respect to VDC-MA, reference is hereby made to commonly owned, concurrently filed, U.S. applications Ser. Nos. 07/458,483, 07/458,487, 07/458,488 and 07/458,490, which are hereby incorporated herein by reference.

Since coextruding a plurality of polymeric melt streams, in a desired relative structural relationship, at a single die exit is commonly practiced, it would be desirable to coextrude vinylidene chloride copolymers with a wide variety of other polymeric compositions. In particular, it would be desirable to be able to coextrude VDC-MA with other polymers which are normally coextrudable only at temperatures which are so high that VDC-MA loses its barrier or other favorable properties. Reference is made to commonly owned and concurrently filed U.S. application, Ser. No. 07/458,486 which is hereby incorporated herein by reference.

U.S. Pat. No. 3,558,330 Widiger et al relates to simultaneous extrusion of VDC-VC with other polymeric materials. They include a table of structures, at least one of which cannot be "coextruded" because one of the components, namely MYLAR is, by definition, already in film form. While Widiger et al generically disclose vinylidene chloride copolymer, al of the examples are specific to VDC-VC, whereby the application of the properties taught therein can only be attributed to VDC-VC.

However, it is well known that vinylidene chloride copolymers are sensitive to the thermal conditions to which they are exposed, as disclosed in subsequent U.S. Pat. No. 4,379,117 Baird Jr. et al. Baird Jr. et al suggest using hollow cavities in the die, to be filled with circulating liquids at an appropriate temperature to protect the vinylidene chloride copolymer from overheating. While Baird Jr. et al mention a plurality of vinylidene chloride comonomers, they do not suggest methyl acrylate comonomer, or any means of protecting the vinylidene chloride methyl acrylate copolymer.

It is an objective of this invention to provide multiple layer coextruded films including a first layer of VDC-MA, and a second layer of another polymeric composition which is typically extrusion processed at a higher temperature than the VDC-MA.

It is a more specific objective to provide multiple layer coextruded films wherein the second layer comprises a polymeric composition which is typically extrusion processed at a temperature at least about 50° C. higher than the normal processing temperature of VDC-MA.

It is yet another object to provide methods and systems of extruding wherein the VDC-MA is exposed to less thermal stress than is characteristic of prior art processes.

SUMMARY OF THE DISCLOSURE

Some elements of these objectives are obtained in a first family of coextruded multiple layer films, comprising a first layer having two opposing sides, a second polymeric layer, and a third polymer layer between the first and second layers. The first layer comprising vinylidene chloride methyl acrylate copolymer. The composition of the second layer is polymeric and has a melting temperature of at least 204° C. The third layer is adapted to maintain the first and second layers spaced from each other.

Other elements of the objectives are obtained in a second, and overlapping family of coextruded multiple layer films wherein the composition of the second layer is selected from the group consisting of polyesters, copolyesters, polyamides, polycarbonates, polypropylenes, propylene ethylene copolymers, ethylene propylene copolymers, combinations of polypropylene and ethylene vinyl acetate copolymer, ultra low density polyethylenes, low density polyethylenes, medium density polyethylenes, high density polyethylenes, linear low density polyethylene copolymers, linear medium density polyethylene copolymers, linear high density polyethylene copolymers, ionomers, ethylene acrylic acid copolymers, ethylene ethyl acrylate copolymers, ethylene methyl acrylate copolymers, and ethylene methacrylic acid copolymers.

Preferred compositions for the second layer, in any of the families, are selected from the group consisting of polyesters, copolyesters, polyamides, and polycarbonates.

The films include embodiments which have a fourth layer on the other side of the first layer and a fifth polymeric layer between the first and fourth layers. The composition of the fourth layer is selected from the same group of materials from which the composition of the second layer is selected, and the fifth layer is adapted to maintain the first and second layers spaced from each other.

In some embodiments, which include the fourth and fifth layers, the film is adapted to driving heat through the film, from the second layer to the fourth layer and thereby activating heat seal properties in the fourth layer.

In some embodiments which include the fourth and fifth layers, the preferred composition of the fourth layer comprises a combination of ultra low density polyethylene and at least one other material selected from the group of materials recited with respect to the fourth layer.

In some of the more narrowly defined embodiments, the third layer is in interfacial bonding contact with both of the first and second layers. Alternatively, or in combination, the fifth layer is in interfacial bonding contact with both of the first and fourth layers.

The fourth layer can optionally be a heat seal layer whereby heat can be driven through the second layer, activating the heat seal properties in the fourth layer, without the second layer becoming so softened that it sticks to the seal bar of the sealing equipment.

Preferred compositions for the third and fifth layers comprise adhesive compositions selected from the group consisting of ethylene vinyl acetate copolymers and ethylene methyl acrylate copolymers. Other adhesive polymers are acceptable so long as they provide good adhesion to the layers on each side of them.

In some of the embodiments which include a heat seal layer, the film includes a sixth impact layer between the VDC-MA layer and the fourth seal layer.

The invention further comprises a first family of methods of making a high barrier multiple layer structure, the methods comprising the steps of selecting a first polymeric barrier layer composition comprising vinylidene chloride methyl acrylate copolymers and coextruding the first polymeric barrier layer composition along with second and third polymeric compositions to form a multiple layer composite comprising, in order, first, third, and second layers corresponding respectively to first, third, and second compositions, and wherein the second composition has a melting temperature greater than 204° C.

In a second overlapping family, the methods include coextruding the first polymeric composition along with a second polymeric composition selected from the group consisting of polyesters, copolyesters, polyamides, polycarbonates, propylene copolymers, combinations of polypropylene and ethylene vinyl acetate copolymer, ultra low density polyethylenes, low density polyethylenes, medium density polyethylenes, high density polyethylenes, linear low density polyethylene copolymers, linear medium density polyethylene copolymers, linear high density polyethylene copolymers, ionomers, ethylene acrylic acid copolymers, ethylene ethyl acrylate copolymers, ethylene methyl acrylate copolymers, and ethylene methacrylic acid copolymers.

The invention also provides an extrusion system wherein the temperature sensitive polymers, e.g., VDC-MA, travels a shorter distance and is in contact with higher melting materials for a shorter period of time, as well as other design improvements. The invention further includes packages made with the films of the invention, and packages made with films made according to methods of the invention. This invention further comprehends such packages which are adapted to storage and extraction of fluids and powders under sterile conditions.

DETAILED DESCRIPTION OF THE ILLUSTRATED EMBODIMENTS

In the numbering herein, the first digit of each element number presents the FIGURE with which that number is identified. The last two digits represent the structural element, with common structural elements in the several FIGURES having the last two digits in common. In some cases in the recitation herein, elements are referred to by only the last two digits, whereby reference is made to all the FIGURES in which that element appears.

Figure 1:
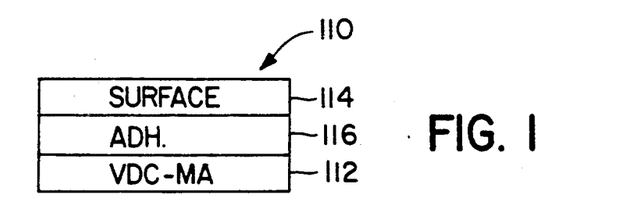
FIG. 1 shows a cross-section of a three layer film of the invention.

FIG. 1 generally represents a three layer film 110, which is fabricated by a coextrusion process. Layer 112 is a VDC-MA. Layer 114 is a surface layer. Layer 116 is an extrudable polymeric adhesive that bonds layers 112 and 114 to each other.

Figure 2:
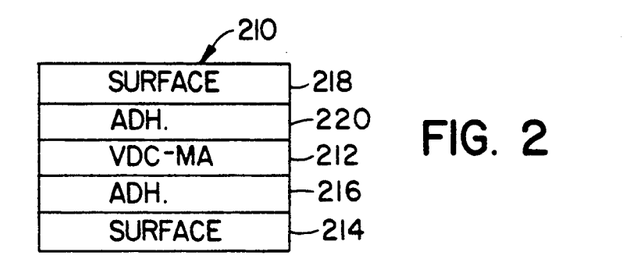
FIG. 2 shows a cross-section of a five layer film of the invention.

FIG. 2 generally represents a five layer film 210, which can be fabricated with a preferred coextrusion process. Interior layer 212 is VDC-MA. Layer 214 is a surface layer. It is preferred that layer 214 be heat sealable, and that it be used as the heat seal interface for fabricating packages, using heat seals. Layer 216 is an adhesive layer which is selected for its capability to bond the selected VDC-MA of layer 212 to the selected composition of surface layer 214.

The composition of surface layer 218 can be a polyolefin such as herein recited for layer 214, and its surface layer 218 can alternatively be a polymer having a higher melting temperature, such as polyester, copolyester, polyamide, copolyamide or linear high density polyethylene. Layer 220 is an extrudable adhesive composition for bonding layer 212 and 218 to each other. If the composition of layer 218 is the same as the composition of layer 214, then the composition of adhesive layer 220 is typically the same as the composition of adhesive layer 216.

When the film or package is to be exposed to elevated processing conditions, for example retort processing conditions or the like, higher melting temperature polymers are preferred for layer 214, such as polypropylene homopolymers (PP), propylene ethylene copolymers (PPE), propylene combined with ethylene vinyl acetate copolymer, linear low density polyethylene (LLDPE), linear medium density polyethylene (LMDPE), medium density polyethylene (MDPE), or high density polyethylene (HDPE). The above materials can advantageously be blended with ultra low density polyethylene (ULDPE) in amounts up to about 20% to about 25% by weight, for increased seal strength, without losing the temperature tolerance of the higher melting temperature material, and while maintaining acceptable levels of extractables for food safety purposes. Where the temperatures are less severe, layer 214 may include greater amounts of ULDPE, up to 100%, so long as extractable levels at the conditions of use are acceptable to government regulators. At lease some ULDPE polymers are presently approved for direct food contact at room temperature. Where ULDPE is used in lesser amounts in layer 214, such as up to 20% to 25%, it lends greater strength to layer 214, and layer 214 forms stronger heat seals.

ULDPE as used herein is a branched polyethylene, like LDPE, polymerized in a high pressure process. It differs from LDPE in that its density can be as low as about 0.86.

The composition of adhesive layer 16 is selected for its capability to bond the selected VDC of layer 12 to the selected composition of surface layer 14. A variety of the well known extrudable adhesive polymers adhere well to VDC-MA layer 12. Thus, if layer 214 is a polypropylene, an adhesive polymer based on polypropylene is desirably selected for layer 216. Examples of such adhesives are the extrudable polymers available under the trade designations Admer QF-500, QF-550, or QF-551 from Mitsui Petrochemical Company, or Exxon 5610A2.

If the composition of layer 214 is an ethylene based polymer, an adhesive polymer based on ethylene is preferably selected for layer 216, including ethylene homopolymers and copolymers. Such a preferred adhesive composition is ethylene vinyl acetate copolymer containing 25% to 30% by weight vinyl acetate. Other ethylene based homopolymers and copolymers, modified to enhance adhesion properties are well known under the trade names of, for example, Bynel, Plexar, and CXA. Typical base polymers for these extrudable adhesives are the polyethylenes and the ethylene vinyl acetate copolymers. Such adhesive polymers, including the polypropylene-based polymers, are typically modified with carboxyl groups such as anhydride. Also acceptable as adhesives are ethylene methyl acrylate copolymers (EMA).

In instances where film 210, as illustrated in FIG. 2, represents the entire film structure, layer 214 typically functions as the heat seal layer, and layer 218 typically functions as the layer which contacts the seal bar. In such structures, the compositions of layers 214 and 218 are selected such that the melting temperature of the layer 218 is greater than the melting temperature of layer 214. The typical melting temperature differential is at least 6° C., preferable at least 17° C. to 28° C. Such temperature differentials are conventionally known and preferred for opposing sides of a heat sealable thin film having a thickness of 10 mils or less. To the extent the composition of layer 218 differs from that of layer 214, the composition of adhesive layer 220 is selected accordingly to assure good adhesion at both the interface of layers 218 and 220 and the interface of layers 212 and 220.

In general, apparatus which can be employed for coextruding the higher temperature polymers with VDC is preferably designed to minimize contact between the VDC copolymer and the metal surfaces of the extrusion equipment. The apparatus preferably is also designed to provide a temperature profile between the VDC melt stream and the higher temperature melt stream which subsequently becomes layer 218, whereby the two melt streams separately experience acceptable processing temperatures, specific to each of the respective melt streams, without unacceptably adversely affecting the performance of the other of the two layers. Such apparatus, and its use in making films of the invention, is more fully described hereinafter in two embodiments illustrated in FIGS. 7 and 8.

Figure 3:
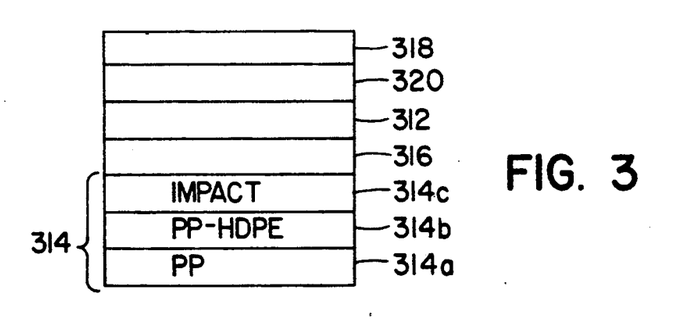
FIG. 3 shows a cross-section of a seven layer film of the invention.

In any of the films of the invention, an outer layer, such as layer 214 or 218 if FIG. 2, can represent a sealant layer, or a multiple layer sealant substructure, as illustrated in FIG. 3. As represented therein 312, 316, 318, and 320 are single layers. 314 represents a substructure of layers 314a, 314b, and 314c. The substructure 314 is intimately bonded into the film structure by adhesive layer 316. For further information with respect to sealants, attention is directed to commonly owned and concurrently filed application Ser. No. 07/458,489, which is hereby incorporated herein by reference.

In some embodiments, and as illustrated in FIG. 3 at layer 314b, a preferred sealant layer composition is a polymeric blend of 65% to 95% by weight of a polypropylene homopolymer or copolymer and conversely 35% to 5% of an ethylene polymer having a density of at least 0.940, and generally known as a high density polyethylene (HDPE). This composition is especially adapted to providing peelable heat seals.

To the extent the propylene polymer is a homopolymer or a copolymer containing up to about 5% ethylene, the larger fractions of HDPE are preferred in the blend composition, up to about 30% HDPE. To the extent the propylene polymer contains more ethylene, such as containing 20% ethylene and 80% propylene, then smaller fractions of HDPE are preferred in the blend composition, such as 10%.

With respect to the multiple layer sealant substructure 314 illustrated in FIG. 3, interior layer 316 serves to bond the substructure 314 into the film. Layer 314b, by means of its blend composition of polypropylene and HDPE, controls the peel strength of the seal. A thin layer, 314a comprising the actual surface of the structure, can be employed. Layer 314a can have a composition which forms strong heat seals, but is thin enough to break relatively easily across its thickness when peel force is applied. Exemplary of the composition of such a layer is polypropylene homopolymer, or propylene ethylene copolymer containing up to about 8 mole percent ethylene. Exemplary thickness for such a layer is about 0.25 mil (64 microns) to about 0.5 mil (128 microns). Below the lower end of the range, seals are more or less indistinguishable in strength from those made with the above blend compositions recited for layer 314b. Above the upper end of the range, the outer layer is so strong as to preclude breaking through the thickness of the outer layer, whereby the peel strength control characteristics of the blend compositions of layer 314b are not achieved.

Figure 4:
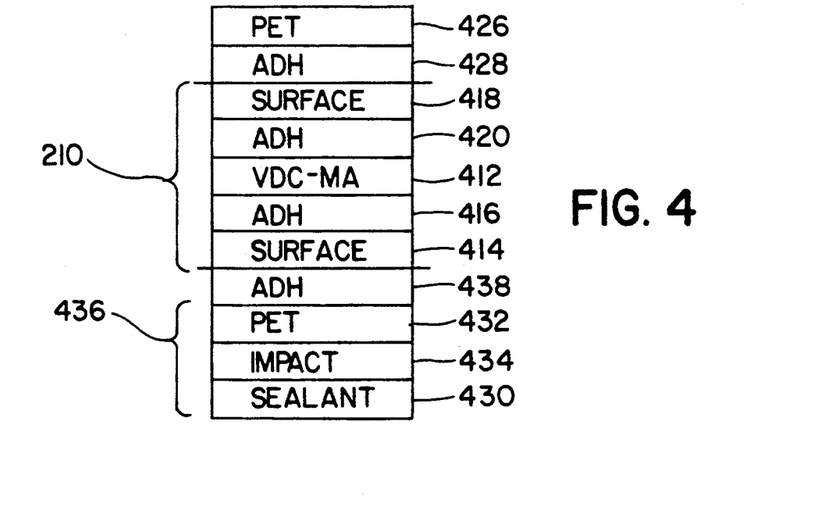
FIG. 4 shows a cross-section of an eleven layer film of the invention.

FIG. 4 represents a more complex structure wherein the film of FIG. 2, which is coextruded, is incorporated into a more complex structure. Thus, as illustrated in FIG. 4, layers 412, 414, 416, 418, and 420 correspond to like layers in FIG. 1, whereby that sub-combination corresponds to film 210. In FIG. 4, the compositions of layers 414 and 418 are typically the same, and usually, but not always, have lower melting temperatures within the ranges recited for layers 14 and 18, especially within the broader range defined for layer 18.

As shown in FIG. 4, a layer 426 of a heat resistant and/or abuse resistant material can be bonded to layer 418 by an adhesive layer 428 such as a curing type urethane adhesive. The composition of layer 426 typically has a higher melting temperature than the composition of the surface layer to which it is bonded. Exemplary of such compositions for layer 426 are polyesters such as polyethylene terephthalate, copolyester, polyamides, and polycarbonates.

A sealant layer 430 is on the other surface of the film. Any of the well known sealant layer materials can be used. Where lower temperature environments are contemplated, the softer polyethylenes and ethylene copolymers are suitable. Where higher temperature environments are contemplated, such as retort condition, then higher temperature materials are preferably selected, such as those based on polypropylene or the higher density polyethylenes, or the combination.

Layer 432 is optional. It can be high temperature polymer whose properties are generally similar to the properties of layer 426. Polyethylene terephthalate is preferred.

Layer 434 is an optional impact layer. Generally, impact layer 434 comprises a base polymer corresponding to a polymer in layer 430 (e.g. polypropylene) and one or more impact modifiers which are typically elastomeric in nature. Exemplary of impact modifiers are polyisobutylene and Tafmer A, available from Mitsui Petrochemical. Tafmer A is an alpha-olefin copolymer and having elastomer-like properties, whereby it can generally be considered as an elastomer. Other materials which exhibit elastomer-like properties can also be used. The purpose of layer 434 is to make the overall structure, and especially heat seals formed by sealant layer 30, more tolerant of shock abuse, such as falling onto a hard surface. Generally, any elastomer which can form an extrudable blend with the primary seal polymer of layer 30 is satisfactory for use in impact layer 34; whereby layer 34 will extrude satisfactorily with layer 30 and will adhere to it.

Layers 430, 432, and 434 are preferably fabricated simultaneously, as by coextrusion, to form a three layer substructure 436 having at least minimal adhesion at the respective layer interfaces. Where enhanced inter-layer adhesion is desired, such as between layers 432 and 434, a layer of an extrudable adhesive is used. For example, where the composition of layer 434 is based on polypropylene, a polypropylene based extrudable adhesive layer (not shown) can be used, such as one of the Admer QF-500 series adhesives, e.g. QF-500, QF-550, or QF-551. Where the composition of layer 434 is based on polyethylene or an ethylene copolymer, an ethylene based extrudable adhesive can be used, such as one of the Plexars, CXA's or Bynels, having a base polymer of ethylene vinyl acetate copolymer (EVA).

Substructure 436 is laminated to film 210 using a lamination process. Any lamination process is acceptable so long as the bonding function is achieved. FIG. 4 illustrates the use of an adhesive layer 438 and suggests an adhesive lamination process. An exemplary adhesive for use in layer 438 is a curing type urethane adhesive, as used for layer 428.

The film of FIG. 4 is preferably fabricated as follows. PET layer 426 is separately extruded, and preferably oriented. The multiple layer substructures represented by 210 and 436 are each coextruded separately. Substructure 210 is adhesively laminated to PET layer 426 using adhesive layer 428. That composite (of 210, 426, and 428) is laminated to substructure 436 using adhesive layer 438. The order of the two laminating steps is not important and can be reversed.

Figure 5:
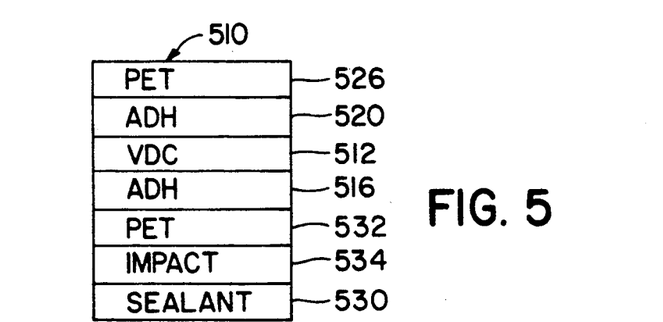
FIG. 5 shows a cross-section of another seven layer film of the invention.

FIG. 5 illustrates a film 510 generally like the film of FIG. 4 in that it has (i) two PET layers 26 and 32 with (ii) an intervening VDC-MA layer 12, (iii) a sealant layer 30, and (iv) an optional impact layer 34 between the sealant layer 30 and the interior PET layer 32. Intervening extrudable adhesive layers 516 and 520 bond the VDC-MA layer 512 to the corresponding PET layers 526 and 532.

In the structure of FIG. 5, the combination of layers 526, 520, 512, 516, and 532, in that order, correspond generally to layers 218, 220, 212, 216, and 214, in that order, in FIG. 2. "Surface layers" 214 and 218 of FIG. 2 are additionally defined in FIG. 5 such that both layers can have a high temperature tolerance (melting point temperature), and the compositions of adhesive layers 216 and 220 are adjusted accordingly. Exemplary adhesive compositions for use in layers 516 and 520 are ethylene vinyl acetate containing 28% by weight vinyl acetate. Impact layer 534 and sealant layer 530 correspond to the like layers 434 and 430 in FIG. 4. Layer 534 is in interfacial contact with layer 532 which corresponds, in terms of composition in the structure, to one of the compositions recited for layer 214 of FIG. 2. However, in FIG. 5, layer 532 is an interior layer.

Films as illustrated in FIG. 5 are preferably fabricated using a coextrusion process. Apparatus and process for coextruding films containing both VDC-MA and a higher melting polymer such as PET are illustrated herein at FIGS. 7 and 8 herein.

Figure 6:
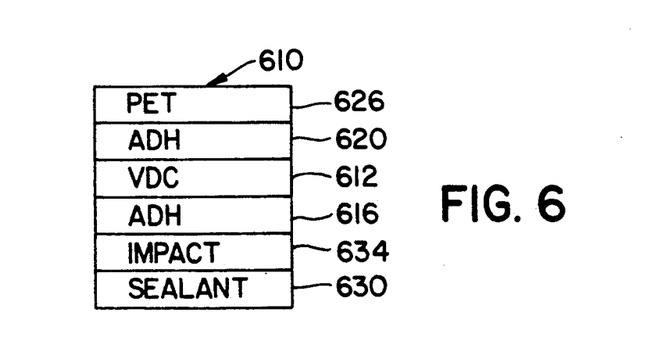
FIG. 6 shows a cross-section of a six layer film of the invention.

FIG. 6 illustrates a film 610 generally like the film of FIG. 5 with the exception that the interior layer 32 of PET of FIG. 5 has been omitted. Film 510 is fabricated by coextrusion. Those skilled in the art can readily adapt the equipment and processes disclosed hereinafter, in order to coextrude the film of FIG. 6.

Layer 612 is VDC. Layers 616 and 620 are adhesives. Layer 626 is PET, or other high melting temperature polymeric composition. Layer 630 is a sealant layer composition, for example polypropylene. Layer 634 is an impact layer as previously disclosed herein.

Figure 7:
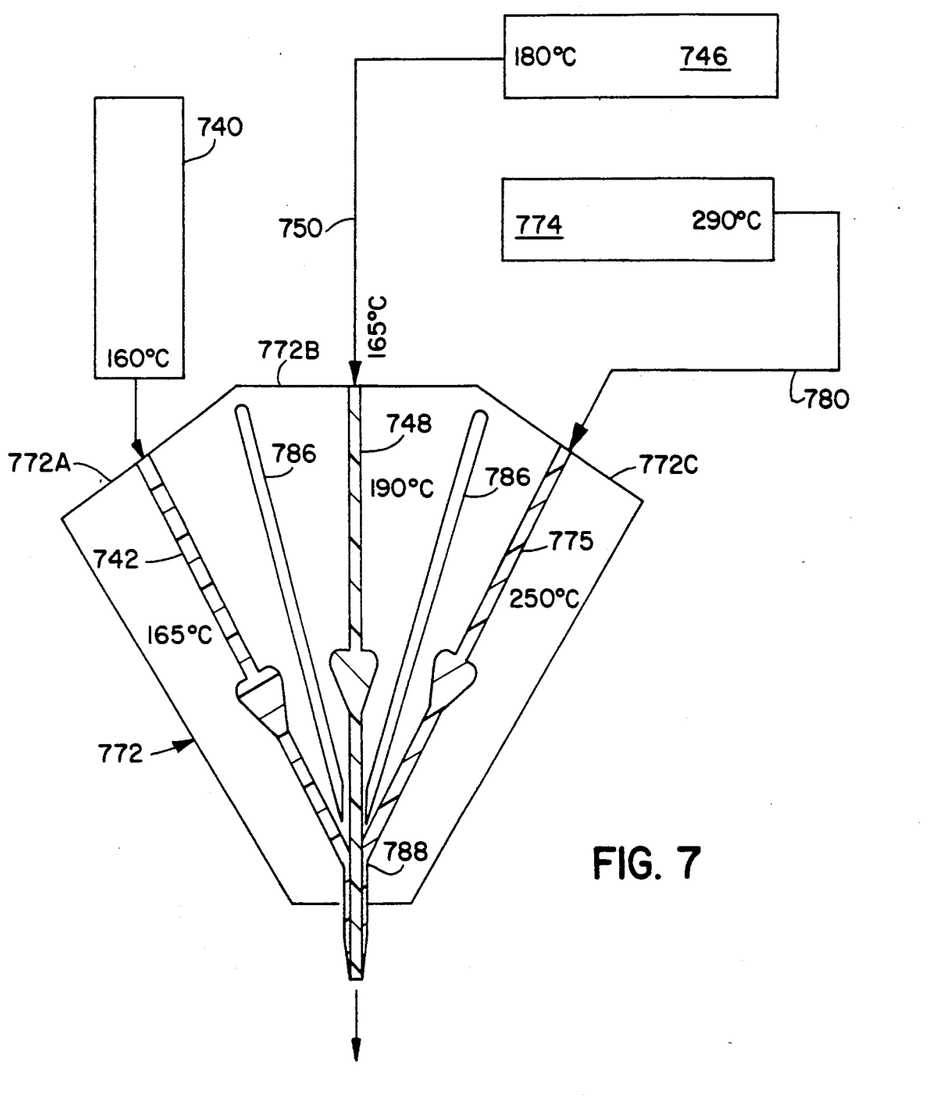
FIG. 7 is a schematic diagram illustrating melt stream temperatures in the several parts of a system, including the die cross-section, in fabrication of the film of FIG. 1.

FIG. 7 diagrammatically illustrates a system arrangement of extruders and die, and illustrative temperatures with respect to the several melt streams, for fabrication of the film illustrated in FIG. 1.

Considering FIG. 7, extruder 740 plasticates a VDC-MA and produces a first polymeric melt stream 742. Extruder 740 has an outlet temperature of about 160°

C., which is conventional in the practice of extruding VDC-MA. The VDC-MA melt stream 742 is fed from extruder 740 to a first segment 772A of die 772 over as short a distance as is practical. Preferably, extruder 740 is fixedly mounted to die 772 whereby there is no substantial intervening transfer means between extruder 740 and 772. In any event, in this illustrated embodiment, any feed pipe between extruder 740 and die 772 is as short as possible and no longer than about 2 feet.

A second extruder 746 plasticates a second polymeric extrudable adhesive composition which is readily coextrudable with VDC-MA using conventional extrusion apparatus and processes, and which adhere sufficiently well to both the VDC-MA and the surface layer 114, producing a second melt stream 748. Typical materials are anhydride modified EVA's and EVA's having a high vinyl acetate content, such as greater than 20% by weight vinyl acetate. Extruder 746 has an outlet temperature of about 180° C., and transfers its melt stream 748 to the central segment 772B of die 772 through transfer pipe 750 which cools the adhesive melt stream 748 to about 165° C. by the time it enters die 772.

A third extruder 774 plasticates a third polymeric composition such as PET in fabrication of the melt stream 775 which is a precursor of surface layer 114. Using PET as an example of the polymer composition being plasticated, extruder 774 has an outlet temperature of 290° C. as is conventionally practiced in extrusion of PET polymers, and transfers its melt stream 775 to segment 772C of die 772 through transfer pipe 780. Transfer pipe 780 cools the PET to about 255° C. by the time it reaches die segment 772C.

Die segment 772A is maintained at about 165° C. Die segment 772B is maintained at about 190° C. Die segment 772C is maintained at about 250° C. The temperature differentials between die segments 772A, 772B, and 772C are maintained by supplying heat in the respective die segments, as needed, from conventional heaters, and by circulating cooling liquids in fluid cavities 786 at sufficiently cool temperatures to avoid undesirable heat transmission between the respective die segments over substantially all of their adjoining areas, down to joining locus 788, where the melt streams 742, 748, and 775 are joined. Thus the cooler VDC-MA melt stream 742 in die segment 772A is shielded from the hotter die segments 772B and 772C, whereby the melt streams 748 and 775 are hotter than melt streams 742 when the melt streams are joined as at locus 788. Shortly after the joinder of melt streams 742, 748, and 775, at locus 788, the joined melt stream exits the die, e.g. within about 1 second to about 3 seconds.

Figure 8:
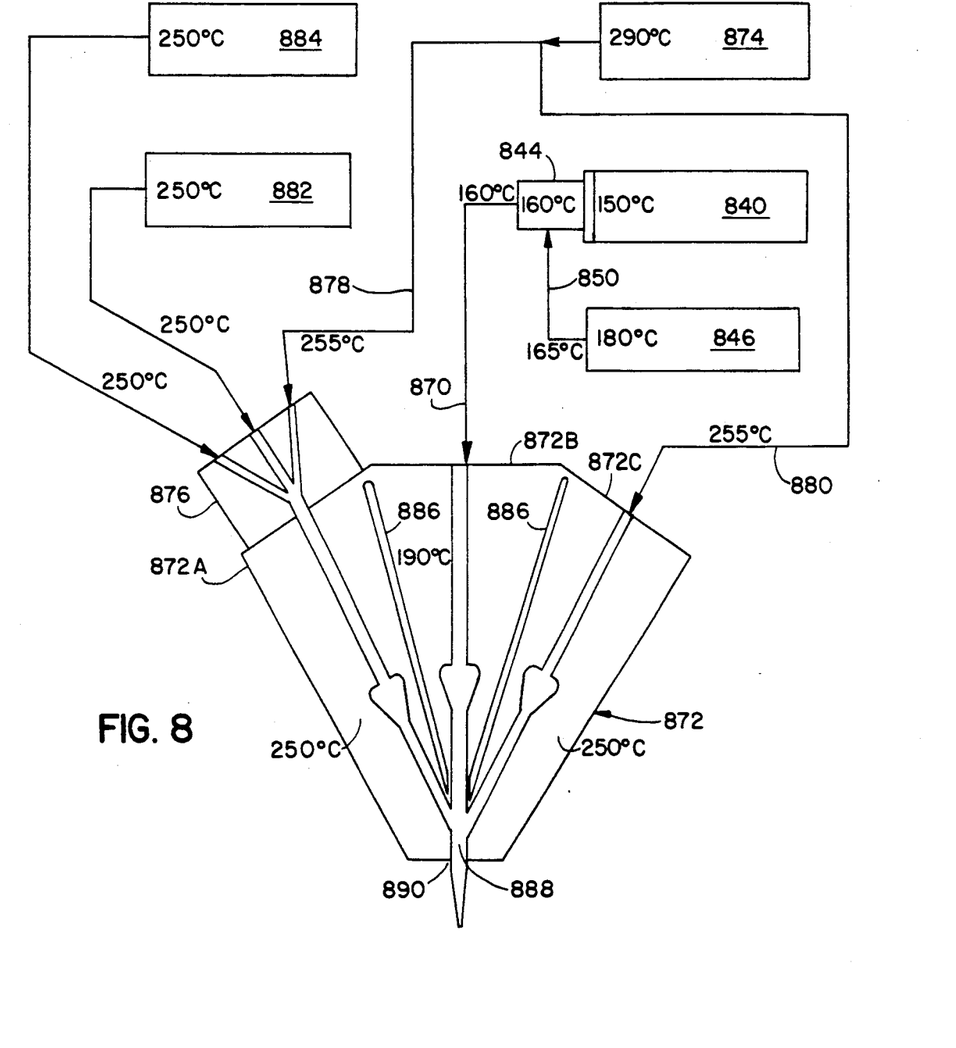
FIG. 8 is a schematic diagram illustrating melt stream temperatures in the several parts of a system, including the die cross-section, in fabrication of the film of FIG. 5.

FIG. 8 diagrammatically illustrates, in the invention, a preferred embodiment of a system arrangement of extruders, feedblock, and die, and illustrative temperature profiling with respect to the several melt streams, suitable for fabrication of the film illustrated in FIG. 5.

Figure 9:
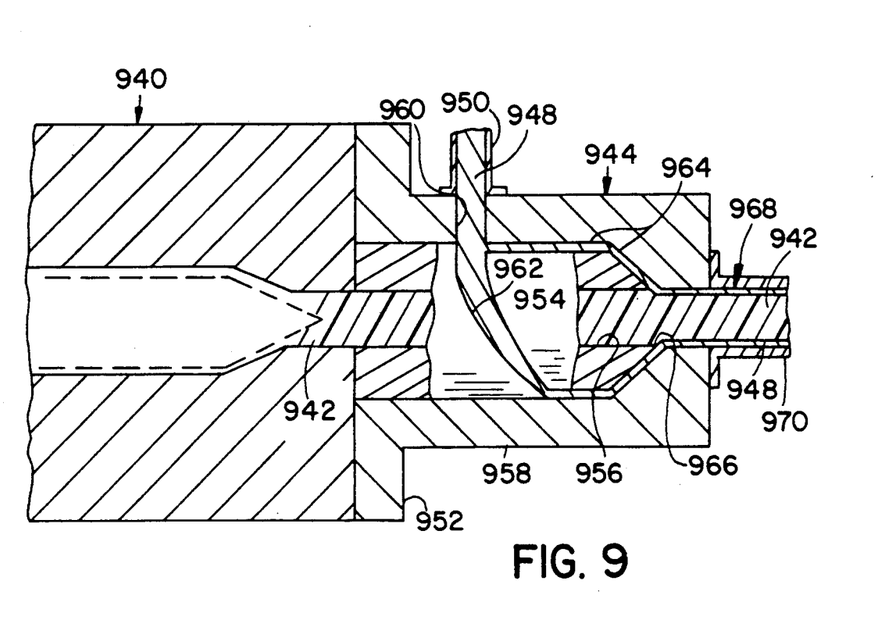
FIG. 9 is a longitudinal cross-section of the encapsulator as seen in FIG. 8.
Figure 10:
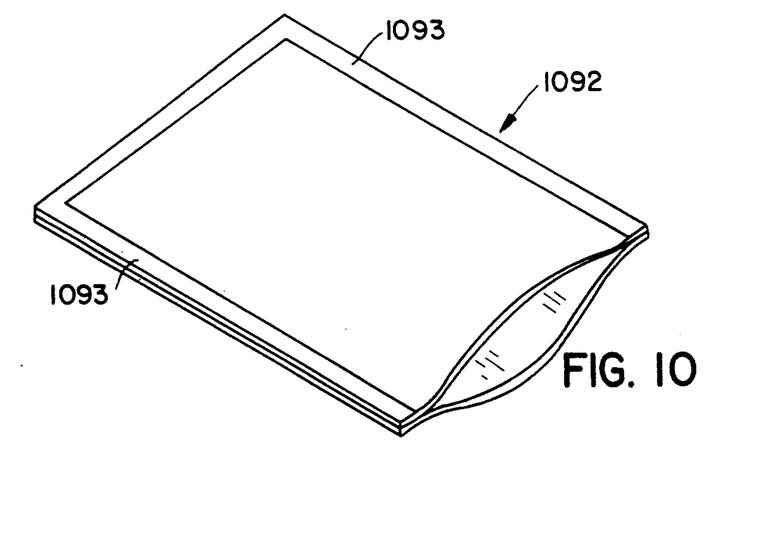
FIG. 10 shows a pictoral view of an open package made with film of this invention.

Considering FIGS. 8-10, extruder 840 plasticates a representative first polymeric composition of VDC-MA and produces a first polymeric melt stream element 942 (FIG. 9). Extruder 840 has an outlet temperature of about 150° C., as is conventionally practiced in extrusion of VDC-MA copolymers. Extruder 840 feeds directly into encapsulator 844. A second extruder 846 plasticates a second polymeric extrudable adhesive composition which is readily apparatus and processes, and which adheres sufficiently well to both the VDC-MA and the PET, producing a second melt stream 948. Typical materials are anhydride modified EVA's and EVA's having high vinyl acetate content, such as greater than 20% by weight vinyl acetate. Extruder 846 has an outlet temperature of about 180° C., and transfers its melt stream to encapsulator 844 through a transfer pipe 850 which cools the adhesive melt stream to about 165° C.

Extruder 846 delivers the second melt stream 948, through a connecting conduit 850, to encapsulator 844 which is mounted to first extruder 840 by means of flange 952 and appropriate connectors, such as bolts, or a clamp. See FIG. 9.

As seen in FIG. 9, encapsulator 944 comprises a central crosshead mandrel 954 having a central bore 956 which receives first melt stream element 942 from extruder 940. Encapsulator 944 further comprises a sleeve 958 surrounding central mandrel 954. Sleeve 958 has an inlet passage 960 for conducting the second polymeric melt stream 948 into the encapsulator 944. Passage 960 leads to a crosshead groove 962 preferably having a tapering cross-section about the circumference of mandrel 954. Groove 962 distributes polymer melt stream element 948 about the circumference of mandrel 954 and between mandrel 954 and sleeve 958. Groove 962 leads to annular channel 964 which has a cross-section approaching a constant with respect to its circumference at any given point.

Annular channel 964 leads to a joinder 966 with central bore 956, where channel 964 and central bore 956 come together, and delivers second polymer melt stream 948 to the joinder in an annular configuration having a generally uniform cross-section about its circumference.

With both melt streams 942 and 948 being supplied by their respective extruders 940 and 946 in constant flows of the melt stream elements, melt stream 942 is thus encapsulated in melt stream 948. Consequently, a combined melt stream 958 is formed from melt streams 942 and 948. The second melt stream is an element of the combined melt stream 968, and forms a continuous layer about the circumference of, and outwardly of, the first melt stream element 942, which is another element of the combined melt stream 968. Thus, the first and second melt stream elements 942 and 948 maintain their individual identity, and first melt stream element 942 is completely enclosed by, and encapsulated in, the second melt stream element 948. The combined melt stream 968 exits encapsulator 944 and enters a transport means 970 which is shown in the illustrated embodiment as a pipe.

Encapsulator 944 of FIG. 9 preferably is maintained at about 160° C., whereby the second adhesive polymer melt stream element 948 is cooled below its extruder output temperature a further 5° C., and whereby the VDC-MA melt stream 942 is heated about 10° C. above its extruder output temperature, but is still maintained within an acceptable temperature range. The temperature of the combined melt stream 968 from encapsulator 944 is held at about 160° C in the transfer pipe 870 as it is conducted from encapsulator 844 to die 872. See FIG. 8.

Referring again to FIG. 8, extruder 874 preferably has an outlet temperature of about 290° C. as is conventionally practiced in extrusion of PET polymers, and transfers its melt stream both to feedblock 876 and to die segment 872C through transfer pipes 878 and 880, respectively. Transfer pipes 878 and 880 cool the PET to about 255° C. by the time it reaches feedblock 876 in die segment 872C. The 255° C. is below the melting temperature of the PET and above its recrystallization temperature.

Extruder 882 processes an impact layer composition preferably comprising about 75% of a polypropylene base resin, 15% by weight polyisobutylene, and 10% by weight Tafmer A elastomeric ethylene butene-1 copolymer. Extruder 882 has an outlet temperature of about 250° C. and transfers its melt stream to feedblock 876 through a transfer pipe which maintains the temperature at about 250° C.

Extruder 884 PPE processes a sealant layer composition preferably comprising a propylene ethylene copolymer containing about 3.5% by weight ethylene. Extruder 884 has an outlet temperature of about 250° C. and transfers its melt stream to feedblock 876 through a transfer pipe which maintains the temperature at about 250° C.

The temperature of feedblock 876 is maintained between 250° C. and 255° C., and is allowed to equilibrate, within that range, with the heat coming in with the three incoming melt streams.

The die 872 in FIG. 8 is a cross-section, but is shown with no cross-hatching and only minimal structural detail. Thus the temperatures indicated are more readily visualized. Die 872 has left, center, and right segments respectively numbered as 872A, 872B, and 872C. The remainder of the system is illustrated diagrammatically. Feedblock 876 is illustrated as being used with the left die segment 872A.

Die segments 872A and 872C. are maintained at about 250° C., thus maintaining the PET polymer in the melt state. Die segment 872B is maintained at about 180° C. The cooler VDC-MA melt stream in die segment 872B is shielded from the hotter die segments 872A and 872C. by cooling passages 886, which operate like the cooling passages 786 in FIG. 7, whereby the melt streams in die segments 872A and 872C. are hotter than the melt stream in die segment 872B where the melt streams are joined as at joining locus 888.

The VDC-MA copolymer tolerates the higher temperature PET because, in the short time of exposure, the temperature differential is absorbed primarily by the intervening adhesive layers 516 and 520, as formed from adhesive material from extruder 846. Accordingly, temperature equilibrium across the multiple layer melt stream is generally not achieved in the die 72. The VDC-MA copolymer experiences a moderate, if any, temperature increase. Since any temperature increase exists for such a short time until cooling begins at the die outlet 890, the effect on degradation of the VDC-MA copolymer is essentially nil.

The PET, having a recrystallization temperature of about 210° C., might be expected to crystallize in the die when it joins the cooler composite melt stream 68 at locus 888. But the 190° C. temperature of the VDC-MA containing melt stream is only modestly below the recrystallization temperature of the PET. And only the inner surfaces of the PET are exposed to this lower temperature. As with the effect on the VDC. copolymer, the PET exits the die at die exit 890 before the thermal dynamics set in motion at joining locus 888 (recrystallization of PET) are manifested in physical changes in the melt stream flow. And after exit, the recrystallization is acceptable, indeed desirable, as part of the process of solidifying the melted extrudate.

Thus the heating of the VDC. copolymer, and the cooling of the PET, both of which are begun at joinder locus 888, are tolerated by the respective polymers because of (i) the short time interval between the joinder of those accompanying cooling of the so-extruded polymers, and (ii) the time lag between the initiation of change at locus 888 and the manifestation of physical effects in the polymers of the melt stream.

FIGS. 7 and 8 illustrate the principle of supercooling a melt stream, such as PET (melting temperature about 260° C.), below its melting temperature before it passes entirely through the die. It further illustrates the principle of joining, in the die, the supercooled melt stream 75 with a melt stream (e.g. 42) which is cooler than the recrystallization temperature (210° C. for PET) of the supercooled melt stream.

Table 1 illustrates exemplary structures, corresponding generally to film 210, which can be successfully coextruded using this invention. From within Table 1, those of ordinary skill in the art, following reasonable and usual practice, will be able to select combinations of compositions for the two surface layers 214 and 218, and appropriate corresponding adhesive compositions for layers 216 and 220. Where the entire film is coextruded as are those illustrated in FIGS. 1-3 and 5-6, at least one layer comprises a high temperature polymeric composition whose normal processing temperature is intolerable to vinylidene chloride copolymers in general unless the vinylidene chloride copolymer is more-or-less shielded from the higher temperature associated with processing the higher temperature polymer. In those structures where film 210 is a substructure within a laminate structure (e.g. FIG. 4) then the film 210 need not necessarily include a high temperature polymer composition. However, because the VDC-MA is even more susceptible to degradation, under conventional extrusion processing conditions, than for example vinylidene chloride vinyl chloride copolymer, the shielding of the VDC-MA from higher temperatures, and its encapsulation as in encapsulator 44, is preferred.

Within Table 1, each listed polymer is in fact a family of polymers. Two or more members listed for a given layer can be mixed together. Further, each listed family is representative of the dominant polymer. Selection of specific polymers for the adhesive layer is, of course, dependent on bonding properties with respect to the compositions selected for the adjacent layers. Most of the well known extrudable adhesives bond satisfactorily to extruded VDC, especially vinylidene chloride methyl acrylate copolymer. The bonding properties of extrudable adhesive polymers with respect to the polymers listed for layers 14 and 18 are fairly well known, whereby the suitability of a given combination of compositions (e.g., with respect to interlayer bonding) can now be confirmed through routine confirmation testing. The layer numbering in Table 1 corresponds to the layer numbering in FIG. 2.

TABLE 1

| Layer 14 | Layer 20 | Layer 12 | Layer 16 | Layer 18 |
|---|---|---|---|---|
| ULDPE |  |  |  | ULDPE |
| LDPE |  |  |  | LDPE |
| MDPE | Extrudable | VDC-MA | Extrudable | MDPE |
| HDPE | Adhesive |  | Adhesive | HDPE |
| LLDPE | (e.g. EVA |  | (e.g. EVA | LLDPE |
| LMDPE | or EMA) |  | or EMA) | LMDPE |
| LHDPE | or blends |  | or blends | LHDPE |
| Ionomer | thereof |  | thereof | Ionomer |
| EAA |  |  |  | EAA |
| EEA |  |  |  | EEA |
| EMA |  |  |  | EMA |
| EMAA |  |  |  | EMAA |
| EVA |  |  |  | EVA |

TABLE 1-continued

| Layer 14 | Layer 20 | Layer 12 | Layer 16 | Layer 18 |
|---|---|---|---|---|
| PP | | | | PP |
| PPE | | | | PPE |
| Polyamide | | | | Polyamide |
| Polyester | | | | Polyester |
| Copoly-ester | | | | Copoly-ester |
| Polycarbonate or blends thereof | | | | Polycarbonate or blends thereof |

In addition to extrudable adhesives, adhesives or tie layers and layers having improved adhesion as described in commonly owned and concurrently filed U.S. application Ser. No. 07/458,484, can be used in this invention; said application Ser. No. 07/458,484 incorporated herein by reference.

Table 2, again employing the numbering in FIG. 2, sets forth preferred materials for Layer 18. It is noted that Layers 14 and 18 may be of the same material.

TABLE 2

| Layer 14 | Layer 20 | Layer 12 | Layer 16 | Layer 18 |
|---|---|---|---|---|
| ULDPE | | | | HDPE |
| LDPE | | | | PP |
| MDPE | Extrudable | VDC-MA | Extrudable | PPE |
| HDPE | Adhesive | | Adhesive | Polyamide |
| LLDPE | (e.g. EVA | | (e.g. EVA | Polyester |
| LMDPE | or EMA) | | or EMA) | Copoly-ester |
| LHDPE | or blends | | or blends | Polycarbonate or blends thereof |
| Ionomer | thereof | | thereof | |
| EAA | | | | |
| EEA | | | | |
| EMA | | | | |
| EMAA | | | | |
| EVA | | | | |
| PP | | | | |
| PPE | | | | |
| Polyamide | | | | |
| Polyester | | | | |
| Copoly-ester | | | | |
| Polycarbonate or blends thereof | | | | |

The coextruded films of this invention, containing a layer of VDC-MA, can be made using thick tapes as the coextrudate, which are suitable for molecular orientation in the solid state. Such tapes may be linear or tubular. Typical thicknesses are of the order of 10–25 mils. The tapes can be oriented in the solid state using conventional orientation processes to form thin, flexible films.

The coextruded films of this invention can also be coextruded as thinner coextrudate films which are not are generally preferred because they are less costly to make, and no particular improvement is seen in the barrier properties of the VDC-MA resulting from its orientation. The thickness of such films is no more than about 20 mils (508 microns). Preferably the thickness of such films is no more than 15 mils (381 microns). To the extent the film is preferred to be flexible, the thickness of the coextrudate film is typically no more than about 10 mils (254 microns) thick. Depending upon the end use, the thickness of flexible coextruded films containing a layer of VDC-MA, as illustrated in FIGS. 1–3, and 5–6, usually ranges from about 1.5 mils (38 microns) to about 8 mils (203 microns). Generally, when the thickness is less than 1.5 mils (38 microns) the film has less than the desired strength for containing the product. At greater than 8 mils (203 microns) to 10 mils (254 microns), the film tends to be less flexible and, for some uses, less cost effective. The cost, of course, depends in part on the compositions of the thicker layers. The degree of flexibility can be either an asset or a liability, depending on the desired package structure. Packages such as those illustrated in FIGS. 10–12 are typically flexible, so flexible films are preferred.

Other uses contemplated include rigid trays having, for example, flexible lids. In such use, the tray is preferably rigid, having a thickness of the order of 60 to 80 mils (1525 to 2055 microns). The lid is flexible with a thickness of preferably no more than 10 mils (254 microns). The thick sheet material for use in making the trays can readily be made using the structures and processes disclosed herein. Such thick structures are not oriented in the solid state except in, for example, the step of fabricating the sheet into trays, as by a thermoforming step, which is only a minor orientation of the layers, and does not generally conform to the term "molecularly oriented" as commonly used in the art.

Additional layers can be combined into the coextruded film on either or both of its surfaces (e.g. layers 12, 14, or 18) as seen in FIG. 4.

Figure 11:
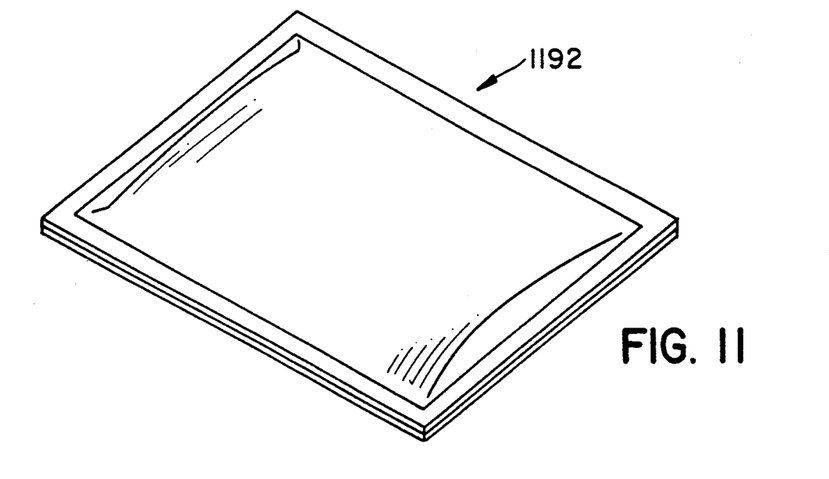
FIG. 11 pictorially illustrates the package of FIG. 10 after it has been filled with product, closed, and sealed.
Figure 12:
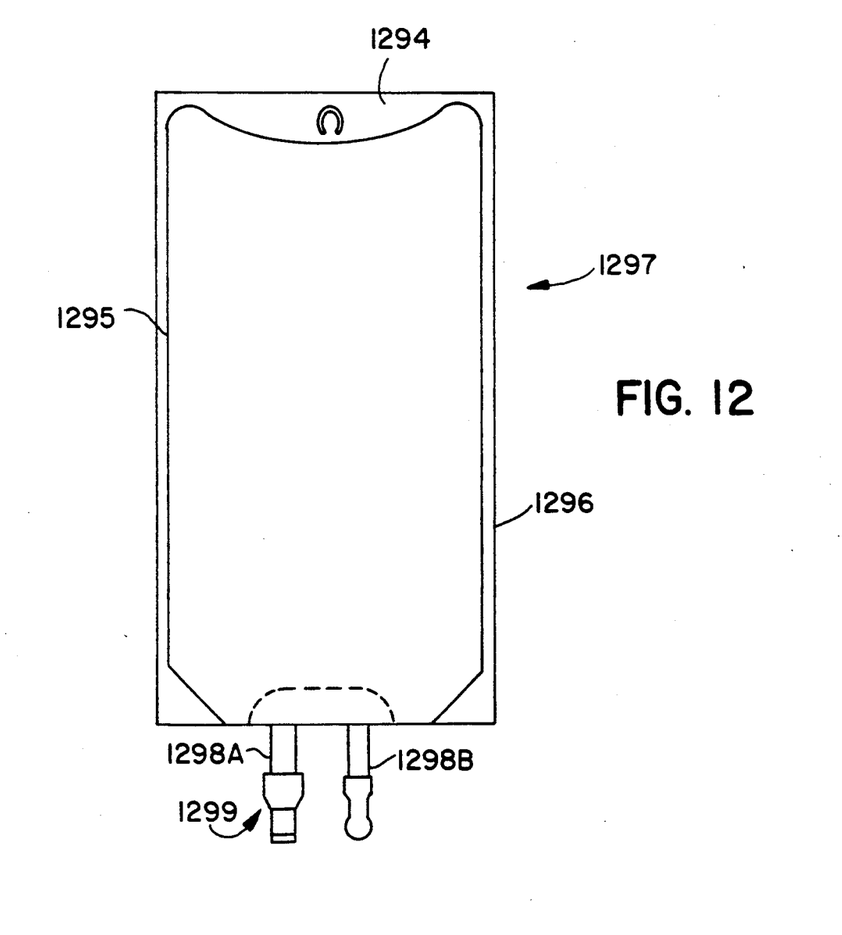
FIG. 12 is a pictorial view of a pouch made with film of this invention and adapted to contain and dispense product under sterile conditions.

The multiple layer films of FIGS. 1–6 are especially useful for making pouches such as those seen in FIGS. 10–12. In one preferred method of making a pouch, such as the one illustrated in FIG. 10, portions of the film are brought into face-to-face contact with each other, such as in a horizontal pouch forming machine, such that portions of one of the surface layers 12, 14, 18, or 30, as appropriate, are facing each other. Heat seals 1093 (FIG. 10) are formed about the common periphery of the facing portions to make an enclosed package capable of holding a product. After product is inserted into the package, a final heat seal is made across the open end to close and seal the package, which then appears as does pouch 1192 seen in FIG. 11.

Another example of an apparatus for forming packages from the films of the present invention is a vertical form, fill and seal packaging machine (not shown). In a typical vertical form, fill and seal packaging machine the film is fed into the machine to a former for folding the web of film. The former is typically situated so that the sheet is folded around a dispensing tube. To create a sealed pouch, as shown in FIG. 12, the packaging machine includes two sealing stations. At one sealing station, an end seal 1294 is created in the film, and at the second sealing station a first side seal 1295 is created in the film, thereby to form a pouch-like container with one open side. The product to be housed is then dispensed into the pouch and a second side seal 1296 is created to seal the open side to thereby enclose the product. After the second side seal 1296 is created, the film is severed and a filled flexible container 1297 is thereby created as shown in FIG. 12.

Also, as illustrated in FIGS. 12, fitments 1298A and 1298B (which preferably are part of a single unit 1299) may be sealed to the inside or outside layer of the container 1297. Preferably, the fitment 1299 is heat sealed to the inside layer (12, 14, 18, or 30 as appropriate), whereby a strong heat seal is created. The use of fitment 1292 adapts the package to containing and dispensing product such as medical fluids and powders, under sterile conditions. Accordingly, where layer compositions are selected such that the packaging material is stable under retort processing conditions, the package can be filled with product, closed and retort processed, whereby the enclosed product is sterilized by the retort processing, and is maintained sterile by the barrier properties of the closed and sealed package. The enclosed sterile product can then be extracted under sterile conditions by the use of fitment 1299. Such a package is thus suitable for, and adapted to, housing medical products, such as fluids, pastes, and powders, to be maintained and extracted under sterile conditions.

Thus it is seen that the invention provides multiple layer coextruded films including a first layer of VDC-MA, and a second layer of another polymeric composition which is typically extrusion processed at a higher temperature than the VDC-MA.

The invention further provides multiple layer coextruded films wherein the second layer comprises a polymeric composition which is typically extrusion processed at a temperature at least about 50° C. higher than the normal processing temperature of VDC-MA.

Yet further, the invention provides methods of extruding wherein the VDC-MA is exposed to less thermal stress than is characteristic of the prior art processes.

Those skilled in the art will now see that certain modifications can be made to the illustrated embodiments of films, packages, apparatus, and methods. Especially, other layer compositions and layer combinations can now be coextruded with VDC-MA in light of the enabling method disclosure herein. All the above modifications to films, packages, apparatus, and methods can be made without departing from the spirit of the instant invention.

While the invention has been described with respect to its preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A coextruded multiple layer film, which comprises:
   (a) a first layer comprising vinylidene chloride methyl acrylate copolymer;
   (b) a second polymeric layer, the composition of said second polymeric layer comprising polyester having a melting temperature of at least 204° C. or copolyester; and
   (c) a third polymeric layer between said first and second layers, said third layer being adapted to maintain said first and second layers spaced from each other.

2. A coextruded multiple layer film as in claim 1, which includes
   (d) a fourth layer on the other said side of said first layer, the composition of said fourth layer being selected from the group consisting of polyesters, copolyesters, polyamides, polycarbonates, polypropylene, propylene copolymers, combinations of polypropylene and ethylene vinyl acetate copolymer, ultra low density polyethylenes, low density polyethylenes, medium density polyethylenes, high density polyethylenes, linear low density polyethylene copolymers, linear medium density polyethylene copolymers, linear high density polyethylene copolymers, ionomers, ethylene acrylic acid copolymers, ethylene ethyl acrylate copolymers, ethyl methyl acrylate copolymers, and ethylene methacrylic acid copolymers; and
   (e) a fifth polymeric layer between said first and fourth layers, said fifth layer being adapted to maintain said first and second layers spaced from each other.

3. A coextruded multiple layer film as in claim 2 wherein said film is adapted to driving heat through said film, from said second layer to said fourth layer and thereby activating heat seal properties in said fourth layer.

4. A coextruded multiple layer film as in claim 2 wherein the composition of said fourth layer comprises a combination of ultra low density polyethylene and at least one other material selected from the group of materials recited with, respect to said fourth layer.

5. A coextruded multiple layer film as in claim 3 wherein the composition of said fourth layer comprises a combination of ultra low density polyethylene and at least one other material selected from the group of materials recited with respect to said fourth layer.

6. A coextruded multiple layer film as in claim 1 wherein said third layer is in interfacial bonding contact with both of said first and second layers.

7. A coextruded multiple layer film as in claim 2 wherein said fifth layer is in interfacial contact with both of said first and fourth layers.

8. A coextruded multiple layer film as in claim 1, and which further comprises:
   (d) a fourth heat seal layer on the other said side of said first layer; and
   (e) a fifth polymeric layer between said first and fourth layers, said fifth layer being adapted to maintain said first and second spaced from each other.

9. A coextruded multiple layer film as in claim 2 wherein the compositions of said third and fifth layers comprise adhesive compositions selected from the group consisting of ethylene vinyl acetate copolymers and ethylene methyl acrylate copolymers.

10. A coextruded multiple layer film as in claim 1 wherein said second layer comprises polyethylene terephthalate, and including a fourth adhesive layer between said second and third layers, and effective to bond said second and third layers to each other.

11. A coextruded multiple layer film as in claim 1, wherein said film further comprises
   (d) a fourth heat seal layer on the other said side of said first layer;
   (e) a fifth polymeric layer between said first and fourth layers; and
   (f) a sixth adhesive layer between said fourth and fifth layers.

12. A coextruded multiple layer film as in claim 3 and including a sixth impact layer between said first layer and said fourth layer.

13. A coextruded multiple layer film as in claim 8 and including a sixth impact layer between said first layer and said fourth layer.

14. A package made with a film of any one of claims 1, 2 or 3–13.

15. A package adapted for storage and extraction of fluids and powders under sterile conditions, said package having been made with a coextruded multiple layer film of any one of claims 1, 2, 3–13.

16. The film of any one of claims 1, 3 or 3–13 in the form of a rigid container.

17. The film of claim 16 wherein the rigid container is a tray.

18. A method of making a high barrier multiple layer structure, said method comprising the steps of:
  (a) selecting a first polymeric barrier layer composition comprising vinylidene chloride methyl acrylate copolymer, a second composition and a third composition; and
  (b) coextruding said first polymeric composition along with said second and third polymeric compositions to form a multiple layer composite comprising, in order, first, third, and second layers corresponding respectively to said first, third, and second compositions, said second composition comprising polyester or copolyester having a melting temperature of at least 204° C. and said third composition being selected so as to maintain said first and second layers spaced apart from each other.

19. A package made with a film made according to a method of claim 18.

20. A package adapted for storage and extraction of fluids and powders under sterile conditions, said package having been made with a coextruded multiple layer film made according to a method of claim 18.

21. A method for coextruding a film having a plurality of layers, said plurality of layers comprising a first layer, a second layer, and a third layer, wherein said second layer is disposed between said first layer and said third layer; said first layer comprising vinylidene chloride methyl acrylate copolymer; and said third layer comprising polyester or copolyester having a melting temperature of at least 204° C.; said method comprising, selecting a material for said second layer so that said second layer shields the extrudate of the first layer from the heat of extrudate of the third layer; and, coextruding said plurality of layers.

* * * * *